(12) United States Patent (10) Patent No.: US 7,894,019 B2
Yamaki et al. (45) Date of Patent: Feb. 22, 2011

(54) WIRE GRID POLARIZER AND LIQUID CRYSTAL DISPLAY DEVICE USING THE SAME

(75) Inventors: Hiroshi Yamaki, Tokyo (JP); Yusuke Sato, Tokyo (JP); Takuji Namatame, Tokyo (JP); Yasuyuki Kawazu, Tokyo (JP)

(73) Assignee: Asahi Kasei Kabushiki Kaisha, Osaka-shi (JP)

( * ) Notice: Subject to any disclaimer, the term of this patent is extended or adjusted under 35 U.S.C. 154(b) by 114 days.

(21) Appl. No.: 12/081,900

(22) Filed: Apr. 23, 2008

(65) Prior Publication Data

US 2008/0303986 A1 Dec. 11, 2008

Related U.S. Application Data

(63) Continuation-in-part of application No. 11/581,410, filed on Oct. 17, 2006, now Pat. No. 7,605,883.

(30) Foreign Application Priority Data

Oct. 17, 2005 (JP) ............................. 2005-301883
Aug. 30, 2006 (JP) ............................. 2006-232967

(51) Int. Cl.
 *G02F 1/1335* (2006.01)
(52) U.S. Cl. ........................................ 349/96
(58) Field of Classification Search ............... None
 See application file for complete search history.

(56) References Cited

U.S. PATENT DOCUMENTS 3,291,871 A 12/1966 Francis
4,545,648 A 10/1985 Shulman et al.
6,122,103 A 9/2000 Perkins et al.
6,532,111 B2 3/2003 Kurtz et al.
6,739,723 B1 5/2004 Haven et al.
7,289,173 B2 10/2007 Kawazu et al.
7,414,784 B2 * 8/2008 Mi et al. .................... 359/486
2002/0044351 A1 4/2002 Nilsen
2005/0122588 A1 6/2005 Kunisada et al.

(Continued)

FOREIGN PATENT DOCUMENTS

EP 1 241 490 A2 9/2002

(Continued)

OTHER PUBLICATIONS

Y. Kanamori et al., "Fabrication of soft nanoimprint stamps and polymer subwavelength gratings by spin coating techniques," SPIE, vol. 5635, Feb. 1, 2005 pp. 144-152.

*Primary Examiner*—Sung H Pak
(74) *Attorney, Agent, or Firm*—Finnegan, Henderson, Farabow, Garrett & Dunner, L.L.P.

(57) ABSTRACT

A wire grid polarizer has mainly a resin substrate 1 having grid-shaped convex portions 1a, a dielectric layer 2 provided to cover the grid-shaped convex portions 1a of the resin substrate 1 and at least part of side faces 1b of the portions, and metal wires 3 provided on the dielectric layer. The wire grid polarizer has a microstructural concavo-convex grid structure having grid-shaped convex portions, is not limited in structure, and has both the excellent degree of polarization and excellent transmittance over a wide range in the visible region.

10 Claims, 7 Drawing Sheets

U.S. PATENT DOCUMENTS

2006/0061862 A1* 3/2006 Mi et al. ............... 359/486
2009/0153961 A1* 6/2009 Murakami et al. ....... 359/486

FOREIGN PATENT DOCUMENTS

| | | |
|---|---|---|
| EP | 1 387 190 A1 | 2/2004 |
| JP | 09-090122 | 4/1997 |
| JP | 2003-502708 | 1/2003 |
| WO | WO-00/79317 A1 | 6/2000 |

\* cited by examiner

WIRE GRID POLARIZER AND LIQUID CRYSTAL DISPLAY DEVICE USING THE SAME

CROSS REFERENCE TO RELATED APPLICATIONS

This application is a Continuation-in-Part of U.S. patent application Ser. No. 11/581,410, filed Oct. 17, 2006 now U.S. Pat. No. 7,605,883, which claimed priority of Japanese Patent Application Nos. 2005-301883, filed Oct. 17, 2005 and 2006-232967, filed Aug. 30, 2006, the contents of which are incorporated herein by reference.

BACKGROUND OF THE INVENTION

1. Field of the Invention

The present invention relates to a wire grid polarizer, and a liquid crystal display device using the wire grid polarizer.

2. Related Background Art

The recent development of photolithography technique has enabled formation of a microstructural pattern with pitches of the level of the wavelength of light. Members and products with such extremely small pitches are of wide application and useful not only in the semiconductor field but also in the optical field.

For example, in a wire grid where wires comprised of metal and the like are arranged in the shape of a grid with specific pitches on a substrate, when the pitches are remarkably smaller than (for example, less than half) the incident light (for example, visible light with wavelengths of 400 nm to 800 nm), the wire grid reflects almost all the electric field vector component of the light vibrating in parallel with the wires, while allowing almost all the electric field vector component of the light perpendicular to the wires to pass through the grid, and is capable of being used as a polarizer to generate a polarized light beam. The wire grid polarizer reflects the light which is not passed through to be reused, and is desirable from the viewpoint of effective use of the light. However, in the existing photolithography technique, it has been difficult to implement a microstructural concavo-convex grid with pitches of the level of 120 nm or less in a large area of 100 cm$^2$ or more.

In recent years, a wire grid polarizer has been developed which has a microstructural concavo-convex grid with small pitches (Japanese Patent Laid-Open No. 2003-502708). As shown in FIG. 10, the wire grid polarizer has a configuration where conductive elements 103 are formed via dielectric films 102 on grid-shaped convex portions 101a of a glass substrate 101. In the wire grid polarizer, the refractive index of a base portion X of the glass substrate 101 is set lower than the refractive index of a region Y with a thickness of the grid convex portion 101a and dielectric film 102. By preparing such a configuration, it is possible to shift to a short-wavelength region a resonance point of causing a resonance phenomenon such that transmission and reflection characteristics of the light rapidly change, and to improve the efficiency of transmission and reflection.

However, the above-mentioned wire grid polarizer needs to consider resonance in the visible light spectrum when the polarizer is used as a diffraction grating, and has a problem that a sufficient degree of polarization is not obtained in a short-wavelength region of the visible light.

SUMMARY OF THE INVENTION

It is an object of the present invention to provide a wire grid polarizer having both an excellent degree of polarization and excellent transmittance over a wide range in the visible region, and a liquid crystal display device using the wire grid polarizer.

A wire grid polarizer of the invention is characterized by having a resin substrate having grid-shaped convex portions, a dielectric layer provided to cover the grid-shaped convex portions of the resin substrate and at least part of side faces of the portions, and metal wires provided on the dielectric layer.

In the wire grid polarizer of the invention, it is preferable that a refractive index of a region including the dielectric layer positioned higher than top portions of the grid-shaped convex portions is higher than a refractive index of the resin substrate.

In the wire grid polarizer of the invention, it is preferable that a refractive index of the dielectric layer is higher than the refractive index of the resin substrate.

In the wire grid polarizer of the invention, it is preferable that pitches of the grid-shaped convex portions of the resin substrate are 150 nm or less.

In the wire grid polarizer of the invention, it is preferable that the dielectric layer is comprised of titanium oxide, cerium oxide, zirconium oxide, aluminum oxide, yttrium oxide, silicon oxide, silicon nitride, aluminum nitride, or a compound thereof.

In the wire grid polarizer of the invention, it is preferable that the metal wires are comprised of aluminum or an aluminum alloy.

In the wire grid polarizer of the invention, it is preferable that the metal wires are provided leaning to one side faces of the dielectric layer.

In the wire grid polarizer of the invention, it is preferable that unit dimensions are 100 cm$^2$ or more.

A liquid crystal display device of the invention is characterized by having a liquid crystal panel, a lighting member that applies light to the liquid crystal panel, and the above-mentioned wire grid polarizer disposed between the liquid crystal panel and the lighting member.

In the liquid crystal display device of the invention, the liquid crystal panel is preferably a transmission liquid crystal panel.

A liquid crystal display device of the invention is characterized by having a light source, the above-mentioned wire grid polarizer that polarizes and divides light from the light source, a liquid crystal display element that transmits or reflects the light polarized by the polarizer, and a projection optical series that projects the light passed through or reflected by the liquid crystal display element onto a screen.

A wire grid polarizer of the invention is characterized by having a resin substrate having grid-shaped convex portions, a dielectric layer provided to cover the grid-shaped convex portions of the resin substrate and at least part of side faces of the portions, and metal wires of which top portions are positioned higher than the convex portions of the dielectric layer.

In the wire grid polarizer of the invention, it is preferable that the metal wires are deposited leaning to one side faces of the convex portions of the dielectric layer.

In the wire grid polarizer, a height difference H$_2$ preferably ranges from 100 nm to 300 nm between a convex-portion peak and a concave-portion valley of a concavo-convex grid formed by covering the grid-shaped convex portions of the resin substrate with the dielectric.

In the wire grid polarizer of the invention, it is preferable that pitches of the grid-shaped convex portions of the resin substrate are 150 nm or less, and that heights thereof are 0.5 time to 2 times the pitches.

A wire grid polarizer of the invention is characterized by having a resin substrate having grid-shaped convex portions, a dielectric layer provided to cover the grid-shaped convex portions of the resin substrate and at least part of side faces of the portions, and metal wires provided on the dielectric layer, where as a cross-sectional shape of the convex portions of the concavo-convex grid formed by covering the grid-shaped convex portions of the resin substrate with the dielectric, in a plane intersecting perpendicularly the longitudinal direction of the grid, the concave portion is substantially in the shape of a parabola, and wH/wL is a ratio of a convex-portion width wH at a height two-thirds a height of the convex portion from a bottom to a convex-portion width wL at a height one-third the height of the convex portion from the bottom, and ranges from 0.3 to 0.9.

In the wire grid polarizer of the invention, a height difference $H_2$ preferably ranges from 100 nm to 300 nm between a convex-portion peak and a concave-portion valley of the concavo-convex grid formed by covering the grid-shaped convex portions of the resin substrate with the dielectric.

In the wire grid polarizer of the invention, a width $w_2$ (hereinafter, referred to as a width of the dielectric layer) at a height half the height difference $H_2$, which is between the convex-portion peak and the concave-portion valley of the concavo-convex grid formed by covering the grid-shaped convex portions of the resin substrate with the dielectric, is preferably 0.1 time to 0.5 time the pitches of the grid-shaped convex portions of the resin substrate.

In the wire grid polarizer of the invention, the metal wires are preferably formed upward from slanting side faces of the convex portions of the concavo-convex grid formed by covering the grid-shaped convex portions of the resin substrate with the dielectric.

BRIEF DESCRIPTION OF THE DRAWINGS

The various features of novelty which characterize the invention are pointed out with particularity in the claims attached to and forming a part of this specification. For a better understanding of the invention, its operating advantages, and specific objects attained by its use, reference should be had to the accompanying drawing and descriptive matter in which there is illustrated and described a preferred embodiment of the invention.

DESCRIPTION OF THE PREFERRED EMBODIMENTS

Figure 1:
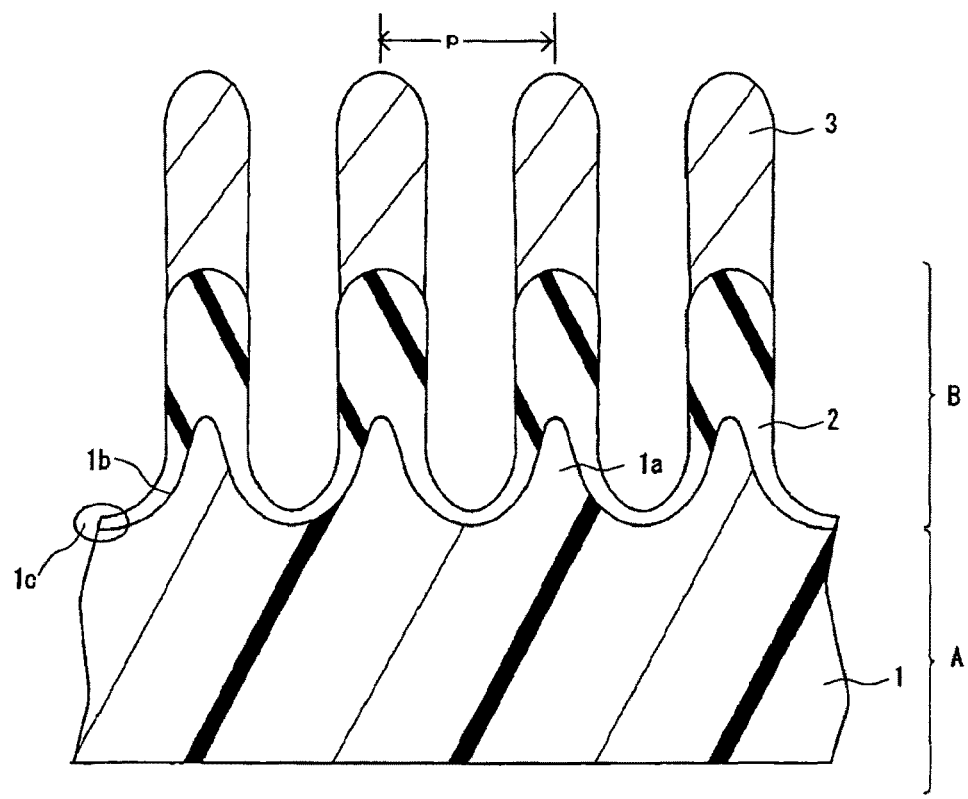
FIG. 1 is a schematic cross-sectional view showing part of a wire grid polarizer according to an embodiment of the invention.

FIG. 1 is a schematic cross-sectional view showing part of a wire grid polarizer according to an embodiment of the invention. The wire grid polarizer as shown in FIG. 1 is mainly comprised of a resin substrate 1 having grid-shaped convex portions, a dielectric layer 2 provided to cover the grid-shaped convex portions 1a (hereinafter, simply referred to as convex portions 1a as appropriate) of the resin substrate and part of side faces 1b of the convex portions 1a, and metal wires 3 provided on the dielectric layer.

A resin for use in the resin substrate 1 is only required to be substantially transparent in the visible region. Examples of such a resin include amorphous thermoplastic resins such as a polymethyl methacrylate resin, polycarbonate resin, polystyrene resin, cycloolefin resin (COP), cross-linked polyethylene resin, polyvinyl chloride resin, polyallylate resin, polyphenylene ether resin, modified polyphenylene ether, polyether imide resin, polyether sulfone resin, polysulfone resin, polyether ketone resin and the like, crystalline thermoplastic resins such as polyethylene terephthalate (PET) resin, polyethylene naphthalate resin, polyethylene resin, polypropylene resin, polybutylene terephthalate resin, aromatic polyester resin, polyacetal resin, polyamide resin and the like, and acryl based, epoxy based or urethane based ultraviolet (UV) curable resins or thermosetting resins and the like. Further, as a substrate, a configuration may be used which is obtained by combining a UV curable resin and/or thermosetting resin that is the resin substrate 1, an inorganic substrate such as glass and the like, the above-mentioned thermoplastic resin, and triacetate resin.

Pitches of the grid-shaped convex portions 1a on the resin substrate of the invention are 150 nm or less, and preferably range from 80 nm to 120 nm, with consideration given to polarization characteristics over a wide range in the visible region. The polarization characteristics improve as the pitch decreases, and in the visible region, sufficient polarization characteristics are obtained using the pitch ranging from 80 nm to 120 nm. Further, when importance is not placed on polarization characteristics of the light with short wavelengths around 400 nm, the pitch can be increased to near 150 nm. In addition, in the invention, the pitch of the grid-shaped convex portions 1a of the resin substrate, the pitch of the dielectric layer, and the pitch of the metal wires are almost the same as the pitch of the wire grid of the invention, and shown by "p" in FIG. 1.

Cross-sectional shapes are not limited particularly in the grid-shaped convex portions 1a, and concave portions 1c of a microstructural concavo-convex grid formed by a plurality of grid-shaped convex portions. For example, cross sections of the portions may be trapezoidal, rectangular, square, and sinusoidal shape such as a prism-shape, semi-circular shape and the like. Herein, the sinusoidal shape means having curvature portions formed by repetition of the concave portion and convex portion. In addition, the curvature portions only need to have a curved line, and for example, a shape of the concave portion with a constriction is included in the sinusoidal shape. From the viewpoint of easiness of the dielectric layer to cover the grid-shaped convex portions of the resin substrate and at least part of side faces of the portions, an end portion or top and a valley of the shape are preferably curved with a moderate curvature. Further, from the viewpoint of improving the adhesion strength between the resin substrate and dielectric layer, the cross section is preferably formed in the sinusoidal shape.

A height difference $H_1$ (hereinafter, referred to as a height of the convex portion $1a$) between the peak of the convex portion $1a$ and the valley of the concave portion $1c$ of the resin substrate 1 is 0.5 time to 2.0 times the pitch p of the grid-shaped convex portions $1a$, and preferably is 1.0 time to 2.0 times the pitch P, to obtain excellent optical characteristics, further obtain high adhesion strength between the substrate and dielectric layer 2, and coat the dielectric layer selectively and highly on the convex portions $1a$.

A width (hereinafter, referred to as a width of the convex portion $1a$) of the convex portion $1a$ at the half height of the convex portion $1a$ is preferably 0.3 time to 0.6 time the pitch of the wire grid, in consideration of the coating of the dielectric layer on the side face of the grid-shaped convex portion $1a$ and deposition of the metal wire via the dielectric layer. The present invention is not limited particularly to a method of obtaining the resin substrate having the grid-shaped convex portions for use in the invention. For example, there is a method as described in Japanese Patent Application No. 2006-2100 by the Applicant. According to Japanese Patent Application No. 2006-2100, using a metal stamper having a concavo-convex grid formed of grid-shaped convex portions with pitches of 230 nm to 250 nm prepared by using an interference exposure method, free-end uniaxial drawing processing with a draw ratio of 4 to 6 times is performed on a thermosetting resin provided with a concavo-convex grid, which is obtained by thermally transferring the concavo-convex grid to the thermosetting resin, in the direction parallel to a longitudinal direction of the grid. As a result, the pitches of the concavo-convex grid transferred to the thermosetting resin are reduced, and the resin substrate (drawn member) is obtained which has the microstructural concavo-convex grid with pitches of 150 nm or less. Then, using the obtained resin substrate (drawn member) having the microstructural concavo-convex grid, a metal stamper having the microstructural concavo-convex grid is prepared using electroplating or the like. Using the metal stamper, the microstructural concavo-convex grid is transferred and formed onto the surface of the resin substrate, and it is thereby possible to obtain the resin substrate having grid-shaped convex portions with pitches of 150 nm or less.

The dielectric constituting the dielectric layer 2 in the invention is required to be transparent substantially in the visible region. Dielectric materials may be suitably used which have high adhesion with the material constituting the resin substrate 1 and the metal constituting the metal wires 3. For example, used are oxides, nitrides, halogen compounds and carbides of silicon (Si) which can be used alone or as a compound thereof (dielectric combined with another element, another dielectric, or compound), and oxides, nitrides, halogen compounds, and carbides of metal, which can be used alone or as a compound thereof, such as aluminum (Al), chromium (Cr), yttrium (Y), zirconium (Zr), tantalum (Ta), titanium (Ti), barium (Ba), indium (In), tin (Sn), zinc (Zn), magnesium (Mg), calcium (Ca), cerium (Ce), copper (Cu) and the like.

In the invention, it is preferable that the refractive index of a region including the dielectric layer positioned higher than top portions of the grid-shaped convex portions is higher than the refractive index of the resin substrate. Herein, the region including the dielectric layer positioned higher than top portions of the grid-shaped convex portions indicates a B region in FIG. 1, and means a region having a specific thickness substantially in parallel with the plane of the resin substrate. In other words, the B region is a region including the dielectric layer on the grid-shaped convex portions $1a$ of the resin substrate 1. The refractive index of the resin substrate is the refractive index of an A region in FIG. 1 i.e. a region of the resin substrate 1 without the grid-shaped convex portions $1a$. Further, in the invention, the refractive index of the dielectric layer is preferably higher than the refractive index of the resin substrate.

As dielectrics selected to have the refractive index higher than that of the resin substrate, for example, preferable are oxides and nitrides of silicon or the above-mentioned metal alone or as a compound. More preferable among these are silicon oxide, titanium oxide, cerium oxide, aluminum oxide, yttrium oxide, zirconium oxide, silicon nitride, and aluminum nitride alone or as a compound thereof.

In the invention, in order to obtain sufficient adhesion strength between the resin substrate 1 and metal wires 3, the dielectric layer 2 is provided to cover the grid-shaped convex portions $1a$ of the resin substrate and at least part of side face portions $1b$ of the portions $1a$. Further, the side faces $1b$ of the grid-shaped convex portions $1a$ of the resin substrate 1 are preferably coated with the dielectric layer 2. From the viewpoints of improvement in adhesion between the grid-shaped convex portions $1a$ and dielectric layer 2 and suppression of low-molecule volatiles generated from the resin substrate, it is more preferable that the entire microstructural concavo-convex grid is covered with the dielectric layer 2. The sufficient adhesion strength is obtained between the resin substrate and dielectric layer by improving the adhesion between the grid-shaped convex portions $1a$ and dielectric layer 2.

The thickness of the dielectric layer 2 (hereinafter, referred to as a height of the dielectric layer) coated on the grid-shaped convex portions $1a$ of the resin substrate preferably ranges from 2 nm to 200 nm, from the viewpoints of optical characteristics, adhesion strength between the resin substrate and metal wires, strength of the wire grid, time required for coating, selective deposition of the metal wires on the convex portions of the dielectric layer or leaning to one side faces of the convex portions of the dielectric layer, and the like. Particularly, the height of the dielectric layer at the peak of the grid-shaped convex portion $1a$ of the resin substrate is preferably in the range of 5 nm to 150 nm. Further, with respect to a height difference $H_2$ (hereinafter, referred to as a height difference $H_2$) between the peak of the convex portion and the valley of the concave portion of the concavo-convex grid formed by coating the grid-shaped convex portions $1a$ of the resin substrate with the dielectric layer 2, the height difference $H_2$ is preferably in the range of 100 nm to 300 nm, and more preferably in the range of 150 nm to 250 nm, in consideration of the strength as a base of the metal wires, optical characteristics and the like.

It is assumed that a width $w_2$ of the dielectric layer (hereinafter, referred to as a width of the dielectric layer) is a width at the half height of the height difference $H_2$. From the viewpoints of optical characteristics and structural strength of the wire grid, it is preferable that the width $w_2$ of the dielectric layer is 0.3 time to 0.6 time the pitch of the grid-shaped convex portions of the resin substrate. When an oblique deposition method, described later, is used in depositing the metal, the width $w_2$ of the dielectric layer is preferably 0.1 time to 0.5 time the pitch of the grid-shaped convex portions of the resin substrate. As the cross-sectional shape of the convex portions of the concavo-convex grid formed by covering the grid-shaped convex portions 1a of the resin substrate with the dielectric 2, in a plane intersecting perpendicularly the longitudinal direction of the grid, a concave portion is substantially in the shape of a parabola, wH/wL (hereinafter, referred to as a width ratio wH/wL) is a ratio of a convex-portion width wH at a height two-thirds a height of the convex portion from a bottom to a convex-portion width wL at a height one-third the height of the convex portion from the bottom, and ranges from 0.3 to 0.9, and each convex portion thus having shorter widths upward is preferable to obtain excellent optical performance while maintaining the sufficient strength of the convex portion, and particularly important in the case where the metal wires are deposited leaning to one side face of the convex portion.

As a method of coating the dielectric on the grid-shaped convex portions of the resin substrate and at least part of side faces of the portions, the method is selected as appropriate corresponding to the material constituting the dielectric layer 2. For example, physical deposition methods may be used suitably such as a sputtering method, vacuum deposition method and the like. The sputtering method is preferable from the viewpoint of the adhesion strength.

In the invention, the metal constituting the metal wires 3 is preferably high in light reflectance in the visible region and further high in adhesion with the material constituting the dielectric layer 2. For example, the metal wires 3 are preferably formed of aluminum, silver or an alloy thereof. In terms of cost, the metal wires 3 are more preferably formed of aluminum or an aluminum alloy.

A width $w_3$ of the metal wire 3 preferably ranges from 0.3 time to 0.6 time the pitch of the grid-shaped convex portions of the resin substrate, from the viewpoints of optical characteristics such as the degree of polarization, transmittance and the like, and structural strength of the wire grid.

A thickness $H_3$ (which indicates a difference between the lowest portion and the height of the highest top portion, and hereinafter, referred to as a height of the metal wire) of the metal wire 3 deposited on convex portions of the dielectric layer 2 coated on peaks of the grid-shaped convex portions 1a of the resin substrate preferably ranges from 120 nm to 220 nm, and more preferably, ranges from 140 nm to 200 nm, from the viewpoints of optical characteristics, adhesion strength between the metal wires 3 and convex portions of the dielectric layer 2, structural strength of the wire grid polarizer, and a processing time required for deposition. Further, a ratio $H_3/w_3$ (aspect ratio) of the height of the metal wire to the width of the metal layer preferably ranges from 2 to 5, and more preferably, ranges from 2 to 4.

A method of depositing the metal on the dielectric layer 2 to form the metal wires 3 is not limited particularly, as long as the method provides sufficient adhesion between the material constituting the dielectric layer 2 and the metal constituting the metal wires 3. For example, physical deposition methods may be used suitably such as the vacuum deposition method, sputtering method, ion plating method and the like. Preferable among the methods is a method enabling the metal to be deposited selectively on convex portions of the dielectric layer 2 or to be deposited selectively leaning to one side faces of the convex portions of the dielectric layer 2. Such a method includes the vacuum deposition method, for example.

In addition, from the viewpoint of optical characteristics, an amount as small as possible is preferable for the metal deposited on the bottom and its vicinity of the concave portion of the microstructural concavo-convex grid. Accordingly, to avoid deposition of the metal at these portions, and further, to facilitate etching (polishing by the etching) described later when the metal is deposited, it is preferable that an oblique deposition method is used to deposit the metal. The oblique deposition method referred to as in the invention is a method for depositing the metal in the direction of an angle (incident angle) θ of 30° or less, preferably 10° to 20°, where the angle θ is formed between the normal of the plane of the resin substrate and a source of deposition within a plane intersecting perpendicularly the grid longitudinal direction of the microstructural concavo-convex grid.

Figure 13:
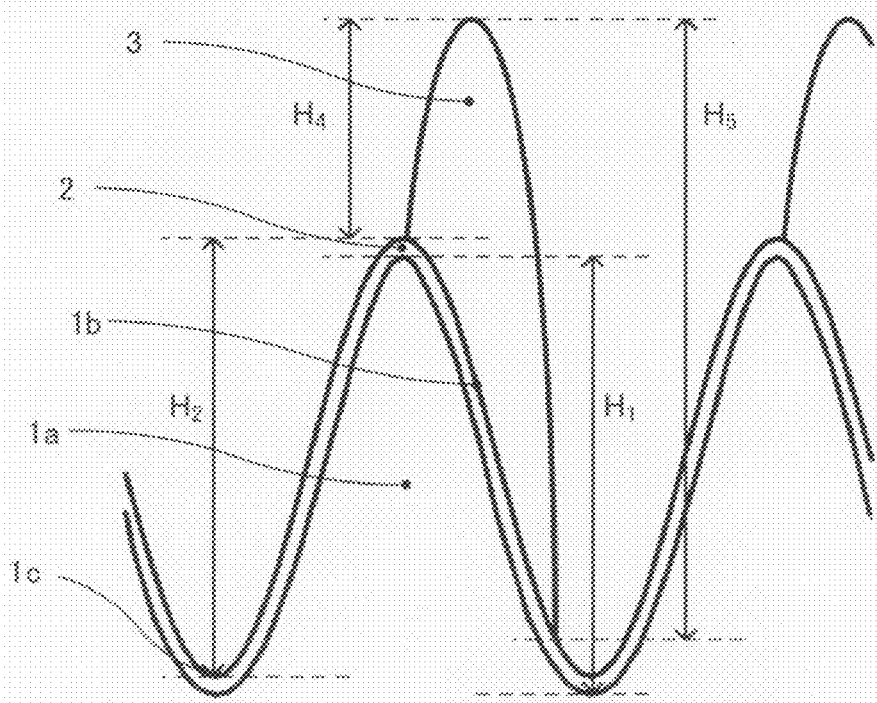
FIG. 13 is a schematic cross-sectional view showing part of the wire grid polarizer according to the embodiment of the invention.

FIG. 13 is a schematic cross-sectional view showing part of the wire grid polarizer according to the embodiment of the invention when the metal is deposited by the above-mentioned oblique deposition method. The wire grid polarizer as shown in FIG. 13 is mainly comprised of a grid-shaped convex-portion resin substrate 1 (hereinafter, also referred to as a resin substrate 1), a dielectric layer 2 provided to cover the grid-shaped convex portions 1a (hereinafter, also referred to as convex portions 1a) of the resin substrate and at least part of side faces 1b of the portions, and metal wires 3 provided in a slanting direction on the dielectric layer.

In FIG. 13, as compared with the schematic diagram of FIG. 1, the thickness of the dielectric layer is thin, and at least part of the metal wires 3 is formed to be positioned higher than the top portions of the grid-shaped convex portions or the convex portions of the dielectric layer 2. Further, in FIG. 13, in the oblique deposition method, a height $H_5$ of the metal wire indicates a height from the lowest portion to the highest top portion of the metal wire, and $H_4$ is indicative of a height from the top portion of the convex portion of the dielectric layer 2 to the top portion of the metal wire. By such a configuration, it is possible to exhibit the excellent degree of polarization over a wide band of the visible region. Further, the metal wires 3 may be formed upward from slanting side faces 1b of the convex portions.

In the wire grid polarizer of the invention, unit dimensions are preferably 100 cm² or more. Herein, the unit dimensions are an area of portions that do not include visually recognized join lines. According to the wire grid polarizer of the invention, grid-shaped convex portions are transferred and formed onto the resin substrate 1, the dielectric layer 2 and metal wires 3 are further formed on the portions, and the polarizer is thereby capable of being prepared, whereby it is possible to obtain such a relatively large plate-shaped member with unit dimensions of 100 cm² or more. Therefore, it is possible to decrease the number of junction portions even when the polarizer is used in a display with a large screen. In this case, it is preferable that junction portions have junction lines with a line width of 100 nm to 100 μm and are configured not to transmit the light.

As described above, the wire grid polarizer of the invention is provided with the dielectric layer 2, having high adhesion with the resin substrate 1 and metal wires 3, provided between the resin substrate 1 and metal wires 3. Therefore, the resin substrate 1 is capable of reliably supporting the dielectric layer 2, and the dielectric layer 2 can be disposed vertically. As a result, the height of the metal wire can be made relatively high. By the metal wire grid with extremely fine pitches formed on the resin substrate, it is possible to exhibit a degree of polarization of 99.9% or more in almost the entire visible region that is a region of light subject to polarization. In this case, it is preferable that the metal wires substantially have a length of about 10 cm or more, and are arranged in optically almost parallel with one another with equal pitches in 6×10$^4$ pieces/cm or more in the width direction of the metal wires.

Figure 2:
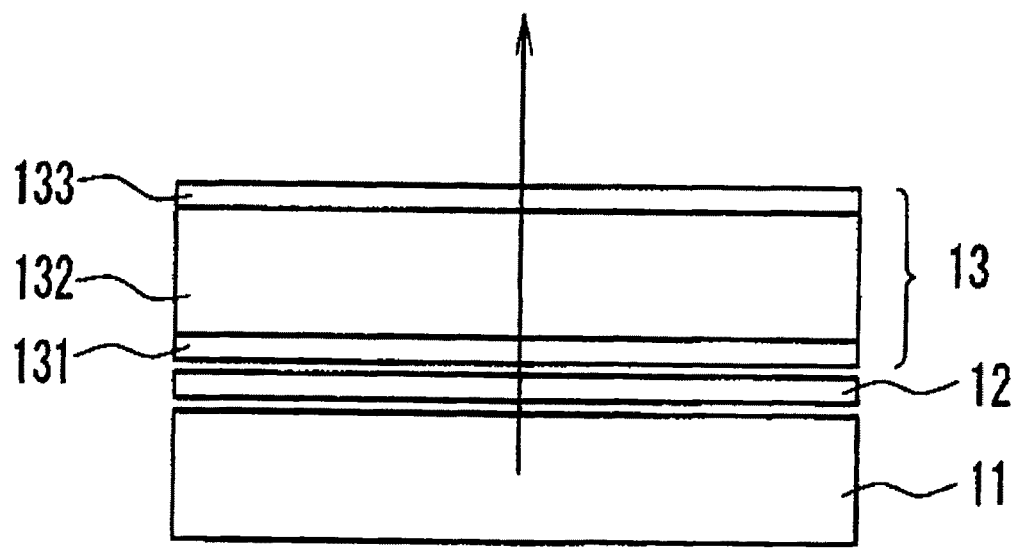
FIG. 2 is a diagram illustrating a liquid crystal display device using the wire grid polarizer according to the embodiment of the invention.

A case will be described below that the wire grid polarizer according to the invention is used in a liquid crystal display device. FIG. 2 shows a mode of a liquid crystal display device using the wire grid polarizer according to this embodiment of the invention.

The liquid crystal display device as shown in FIG. 2 is mainly comprised of a lighting device 11 such as a backlight which emits the light, a wire grid polarizer 12 disposed above the lighting device 11, and a liquid crystal panel 132 and polarizer 133 disposed above the wire grid polarizer 12. In other words, the wire grid polarizer 12 according to the invention is arranged between the liquid crystal panel 132 and lighting device 11.

The liquid crystal panel 132 is a transmission liquid crystal panel, and is formed of a liquid crystal material and the like sandwiched between glass substrates or transparent resin substrates. In addition, in the liquid crystal display device in FIG. 2, descriptions are omitted on various optical elements such as a polarizer protective film, retardation film, diffusion plate, alignment film, transparent electrode, color filter and the like which are generally used.

In the liquid crystal display device with such a structure, the light output from the lighting device 11 is incident on the base side of the resin substrate 1 of the wire grid polarizer 12, output from the wire side, passed through the liquid crystal panel 132 and output to the outside (the direction of the arrow shown in the figure). In this case, the wire grid polarizer 12 exhibits an excellent degree of polarization in the visible region, and it is thereby possible to obtain high-contrast display. Further, when higher contrast is required, in order to prevent the (external) light incident from the outside of the polarizer 133 i.e. in the direction opposite to the lighting device 11 from being passed through the liquid crystal panel 132, reflected by the wire grid polarizer 12, and output again to the outside of the liquid crystal panel 132, it is preferable to insert an absorption type polarizer 131 using a dichromatic dye such as iodide and the like between the wire grid polarizer 12 and liquid crystal panel 132 with its polarization axis matched with the polarization axis of the wire grid polarizer 12. In this case, the absorption type polarizer is preferably high in transmittance, and allowed to have a low degree of polarization.

The wire grid polarizer of the invention can be used as a polarizer of a projection type liquid crystal display device. The projection type liquid crystal display device is mainly comprised of a light source, the wire grid polarizer that polarizes and divides the light from the light source, a liquid crystal display element that transmits or reflects the light polarized by the polarizer, and a projection optical series that projects the light passed through or reflected by the liquid crystal display element onto a screen. In other words, the wire grid polarizer according to the invention is arranged between the light source and liquid crystal display element.

Described next are Examples performed to clarify the effects of the invention.

(Preparation of a Resin Substrate Having the Grid-shaped Convex Portions)

Preparation of a COP Plate with a Concavo-convex Grid Shape Transferred Thereto.

Prepared was a nickel stamper having on the surface a concavo-convex grid with the height of the concavo-convex grid of 230 nm and the pitch of 230 nm. The concavo-convex grid was made by patterning using the laser interference exposure method, sinusoidal shape in cross section and streak grid shape in upper face. The dimensions of the plane were 500 mm both in length and width. Using the nickel stamper, the concavo-convex grid shape was transferred to the surface of a cycloolefin resin (hereinafter, abbreviated as a COP plate) with a thickness of 0.5 mm and length and width of 520 mm by hot press method, and a COP plate with the concavo-convex grid shape transferred thereto was thus prepared. The glass transition temperature (Tg) of the COP was 105° C.

More specifically, hot press was performed as described below. First, a pressing machine was evacuated, and the nickel stamper and COP plate were heated to 190° C. After the nickel stamper and COP plate reached 190° C., the concavo-convex grid of the nickel stamper was transferred to the COP plate at a pressing pressure of 2 Mpa for four minutes of pressing time. Further, with the pressing pressure kept at 2 MPa, the nickel stamper and COP plate were cooled to 40° C., the vacuum was released, and then, the pressing pressure was released. When the pressing pressure was released, the nickel stamper and COP plate were easily removed. The surface shape of the COP plate with the concavo-convex grid shape transferred thereto was observed using a field-emission scanning electron microscope (hereinafter, abbreviated as FE-SEM) and it was confirmed that the concavo-convex grid shape of the nickel stamper was transferred faithfully.

Reduction in Pitch by Drawing

Next, the COP plate with the concavo-convex grid shape transferred thereto was cut into 520 mm×460 mm rectangles to be COP plates for drawing as drawing target member. At this point, the plates were cut so that the longitudinal direction (520 mm) of the 520 mm×460 mm rectangle was substantially parallel with the longitudinal direction of the grid.

Silicone oil was coated on surfaces of the COP plates for drawing by spray, and placed in a circular air oven at about 80° C. for 30 minutes. Next, the COP plate for drawing was fixed by chucks of a drawing machine at its opposite ends of 10 mm in the longitudinal direction, and placed in this state in a circular air oven with the temperature adjusted to 113±1° C. for 10 minutes. Then, drawing was performed at speed of 250 mm/min, and finished when the distance between the chucks was drawn by five times, and twenty seconds later, the drawn COP plate was placed in an atmosphere of room temperature, and cooled with the distance between the chucks kept. The drawn COP plate was almost uniformly constricted at about 40% of the center portion, and the width of the most shrank portion was 200 mm. Similarly, the COP plates were drawn while changing only the distance between the chucks to 3.5 times and 2.5 times, and the minimum widths of the center portions of the drawn COP plates were 240 mm and 280 mm, respectively.

The surface and cross section of each of these three types of drawn COP plates were observed by FE-SEM, and it was understood that the pitch and height of the microstructural concavo-convex grid of each of the plates were 100 nm/95 nm (pitch/height), 120 nm/113 nm, or 140 nm/133 nm, the cross section was in the sinusoidal shape, the shape from the upper face was a streak-shaped grid shape, and that the plates were shrank substantially in similar figures to the concavo-convex grid shape prior to the drawing.

Preparation of Nickel Stampers

Surfaces of obtained drawn COP plates with respective pitches of 100 nm, 120 nm and 140 nm were coated with gold in 30 nm by sputtering as processing of providing conductivity, and given electro-nickel-plating, and nickel stampers were prepared each with a thickness of 0.3 mm, distance in the longitudinal direction (hereinafter, referred to as a length) of the grid of 300 mm, and distance in the direction (hereinafter, referred to a width) perpendicular to the longitudinal direction of the grid of 180 mm.

Figure 3A:
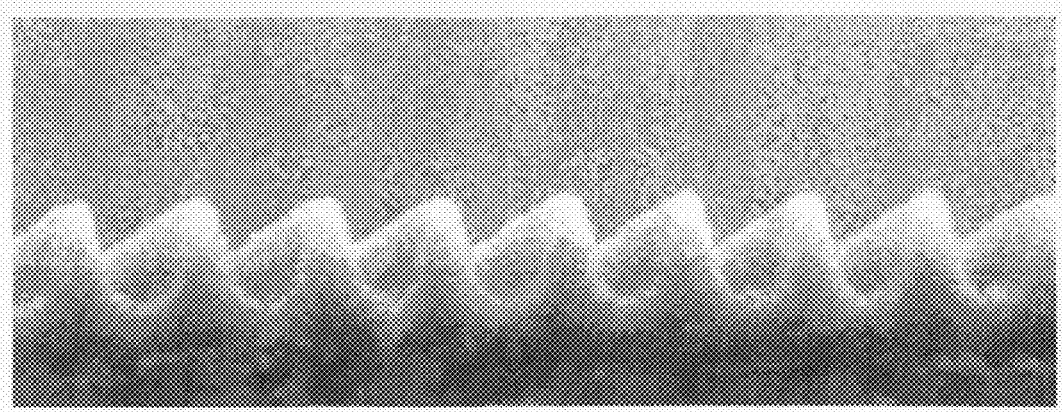
FIG. 3(a) is a typical SEM image of a cross section of a grid-shaped convex-portion transferred film.
Figure 11A:
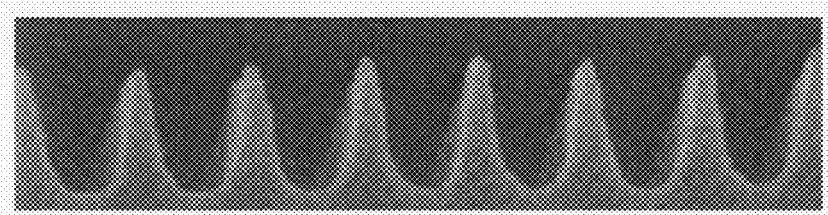
FIGS. 11(a) and 11(b) are typical SEM images of a cross section of a grid-shaped convex-portion transferred film.
Figure 11B:
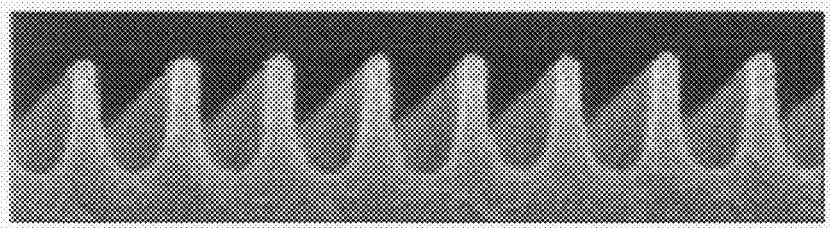

Preparation of Grid-Shaped Convex-Portion Transferred Films Using UV Curable Resin A UV curable resin (TB3078D, Three Bond Co., Ltd. Refractive index: 1.41) with a thickness of about 0.03 mm was coated on a polyethylene terephthalate resin film (hereinafter, referred to as a PET film) with a thickness of 0.1 mm. With the coated surface downward, the PET film was mounted on each of the above-mentioned nickel stampers respectively having microstructural concavo-convex grids with pitches of 100 nm, 120 nm and 140 nm starting with the end portions for the air not to enter between the nickel stamper and film, and radiated with UV rays of 1000 mJ/cm$^2$ from the PET film side using a UV lamp with the center wavelength of 365 nm to transfer the microstructural concavo-convex grid of the nickel stamper. Then, the PET film was removed from the nickel stamper, and further radiated with UV rays of 500 mJ/cm$^2$ under an atmosphere of nitrogen to cure the UV curable resin on the PET film, and prepared was a film (hereinafter, referred to as a grid-shaped convex-portion transferred film) with the microstructural grid with a length of 300 mm and width of 180 mm transferred thereto. The cross section of the grid-shaped convex-portion transferred film was observed using FE-SEM to obtain the height $H_1$ of the convex portion of the grid-shaped convex-portion transferred film. The results are shown in Table 1. FIG. 3(a), and FIGS. 11(a) and 11(b) are typical SEM images of the cross section of the grid-shaped convex-portion transferred film. The grid-shaped convex-portion transferred film obtained by the above-mentioned method was used as a resin substrate having the grid-shaped convex portions.

EXAMPLES 1 to 6

Preparation of a Wire Grid Polarizer

Formation of a Dielectric Layer Using a Sputtering Method

Figure 3B:
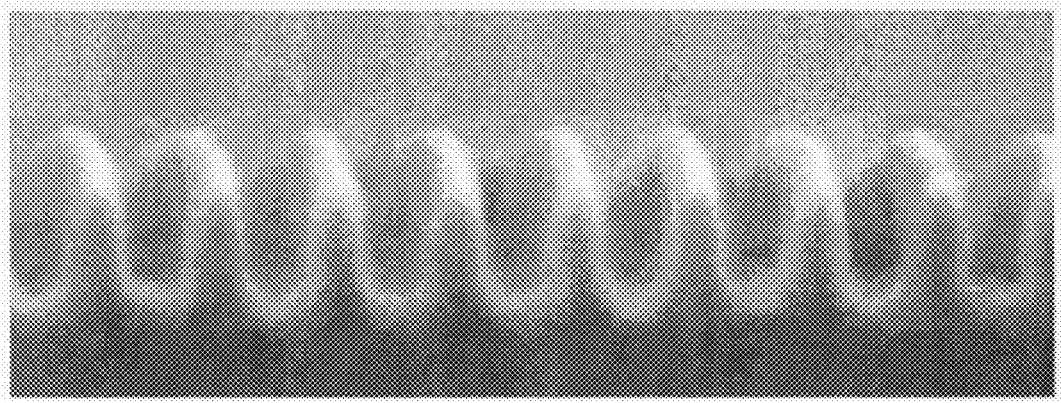
FIG. 3(b) is a typical SEM image of a cross section of a dielectric coated on grid-shaped convex-portion transferred film.

A dielectric layer was formed on each of the grid-shaped convex-portion transferred films respectively having three kinds of pitches prepared by the above-mentioned method, using the sputtering method. This embodiment describes the case of using silicon nitride or silicon oxide as the dielectric. The dielectric was coated at an Ar gas pressure of 0.67 Pa, sputtering power of 4 W/cm$^2$ and coating rate of 0.22 nm/sec. A glass substrate with a smooth surface was set in a sputtering machine as a thickness comparative sample concurrently with the grid-shaped convex-portion transferred film, and film formation was performed so that a deposition thickness of the dielectric layer on the smooth glass substrate was 20 nm. The cross section of the grid-shaped convex-portion transferred film coated with the dielectric was observed using FE-SEM to obtain the height difference $H_2$ and width ratio wH/wL. Further, using a spectroscopic ellipsometer, refractive indexes of the dielectric and B region were obtained. The results are also shown in Table 1. FIG. 3(b) is a typical SEM image of the cross section of the grid-shaped convex-portion transferred film (hereinafter, referred to as a dielectric coated grid-shaped convex-portion transferred film) with the dielectric layer formed thereon.

Deposition of Metal Using a Vacuum Deposition Method

After the dielectric layers were formed on the grid-shaped convex-portion transferred films respectively having three types of pitches, metal wires were formed using an electron beam vacuum deposition method (EB deposition method). This embodiment describes the case of using aluminum (Al) as metal. Deposition of Al was performed at room temperature, a degree of vacuum of 2.5×10$^{-3}$ Pa and deposition rate of 4 nm/sec. A glass substrate with a smooth surface was set in an EB deposition machine as a thickness comparative sample concurrently with the dielectric coated grid-shaped convex-portion transferred film, and deposition was performed so that a thickness of Al deposition on the smooth substrate was 200 nm. In Examples 1 to 5, an angle θ formed between the normal of the substrate plane and the deposition source was 10° within the plane perpendicularly intersecting the longitudinal direction of the grid, and only in Example 6, such an angle was 20°.

Removal of Unnecessary Metal by Etching

Figure 3C:
FIG. 3(c) is a typical SEM image of a cross section of the wire grid polarizer of the invention.
Figure 12:
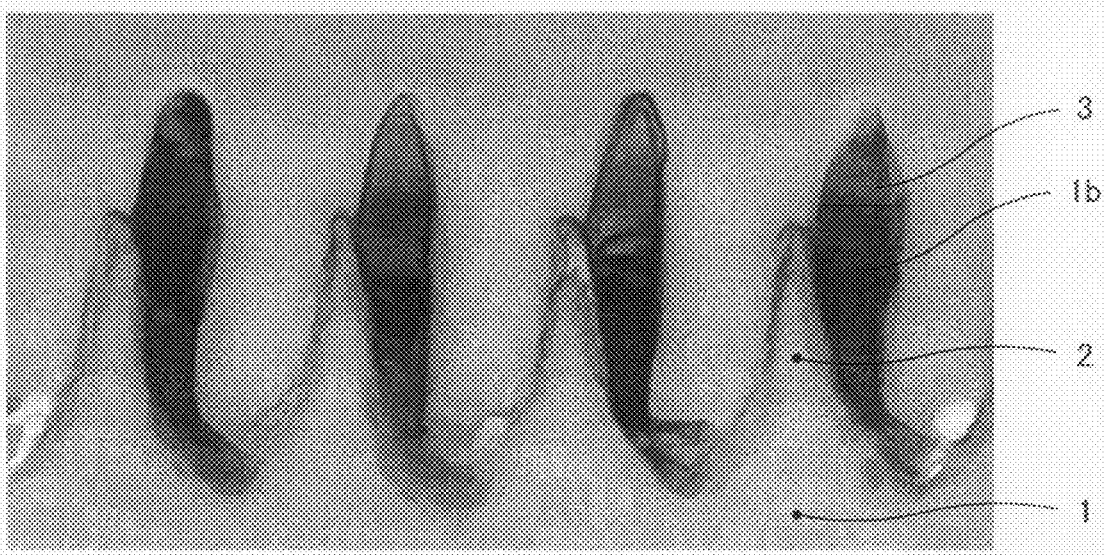
FIG. 12 is a typical SEM image of a cross section of the wire grid polarizer of the invention.

After the dielectric layers and Al was deposited on the grid-shaped convex-portion transferred films respectively having three types of pitches, the films were cleaned (etching) in an aqueous 0.1 wt % sodium hydroxide solution at room temperature for 30 to 90 seconds of the processing time while being changed at ten-second intervals, and rinsed immediately to halt etching. After the films were dried, the degree of polarization and transmittance were measured on the light with a wavelength of 550 nm, and films with the degree of polarization of 99.95% or more and the maximum transmittance were selected (except Example 2 where the film with the degree of polarization of 99.99% or more and maximum transmittance was selected) to be wire grid polarizers of the invention. The wire grid polarizers were 300 mm long and 180 mm wide. The cross section of each of three types of wire grid polarizers was observed using FE-SEM to measure the pitch of the grid-shaped convex portions, and height and width of deposited aluminum. The results are also shown in Table 1. FIG. 3(c) and FIG. 12 are typical SEM images of the cross section of the obtained wire grid polarizer. As can be seen from FIG. 3(c), the dielectric layer 2 is formed on the resin substrate (UV curable resin) 1, and the metal wires (Al) 3 are formed on the dielectric layer 2. In FIG. 12, the dielectric layer 2 is formed on the resin substrate 1, and the metal wires are deposited leaning to one side faces of the convex portions of the dielectric layer. Further, in FIG. 12, the metal wires are formed upward from slanting side faces 1b of the convex portions. Polarization performance was evaluated on the prepared wire grid polarizers. The results are shown in Table 1, and FIGS. 5 and 6.

As Comparative Example 1, aluminum was deposited on the grid-shaped convex-portion transferred film in the same way as in the above-mentioned Examples except the dielectric being not coated, and cleaned in the aqueous 0.1 wt % sodium hydroxide solution for 60 seconds. In this case, wires of Al required to exhibit the polarization performance were present, but removed partially from the grid-shaped convex portions of the substrate, and it was not possible to prepare any wire grid polarizers to be evaluated.

As Comparative example 2, a commercially available wire grid polarizer (ProFlux Polarizer PPL03C (General Purpose), MOXTEK Inc.) with a glass substrate as a base was used.

As Comparative Example 3, the same commercially available wire grid polarizer with a glass substrate as a base as in Comparative Example 2 was etched in the aqueous 0.1 wt % sodium hydroxide solution for 20 seconds, rinsed immediately to halt etching, and dried.

Figure 4:
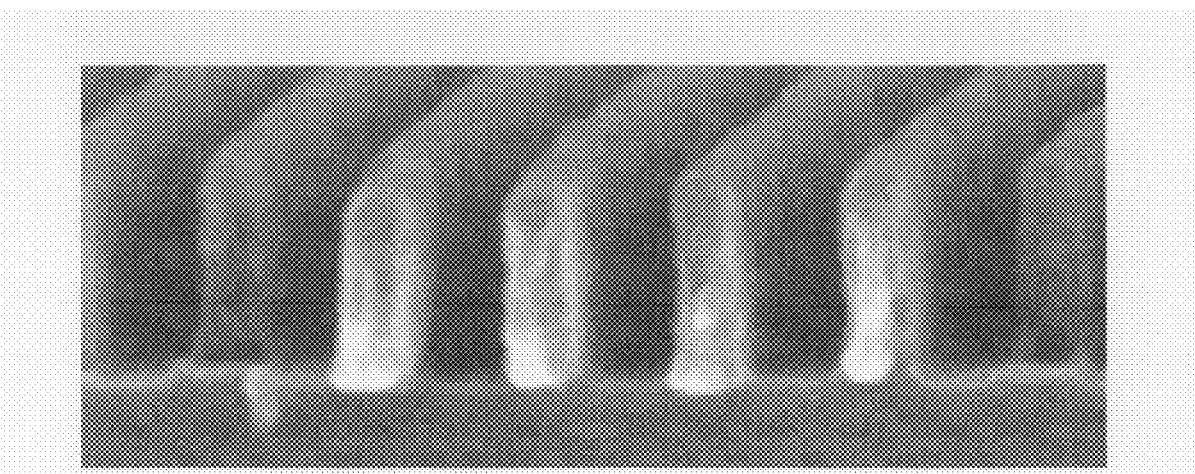
FIG. 4 is a SEM image of a cross section of a wire grid polarizer of Comparative Example 2.

The cross section of each of the wire grid polarizers was observed using FE-SEM to measure the pitch of the grid-shaped convex portions and the height and width of the metal wire. The results are also shown in Table 1. FIG. 4 shows a SEM image of the cross section of the wire grid polarizer of Comparative Example 2. As can be seen from FIG. 4, the metal wires (Al) are formed on the glass substrate. These wire grid polarizers were evaluated on polarization performance as in the Examples. The results are also shown in Table 1, and FIGS. 5 and 6.

(Evaluation of Polarization Performance Using a Spectrophotometer)

Figure 5:
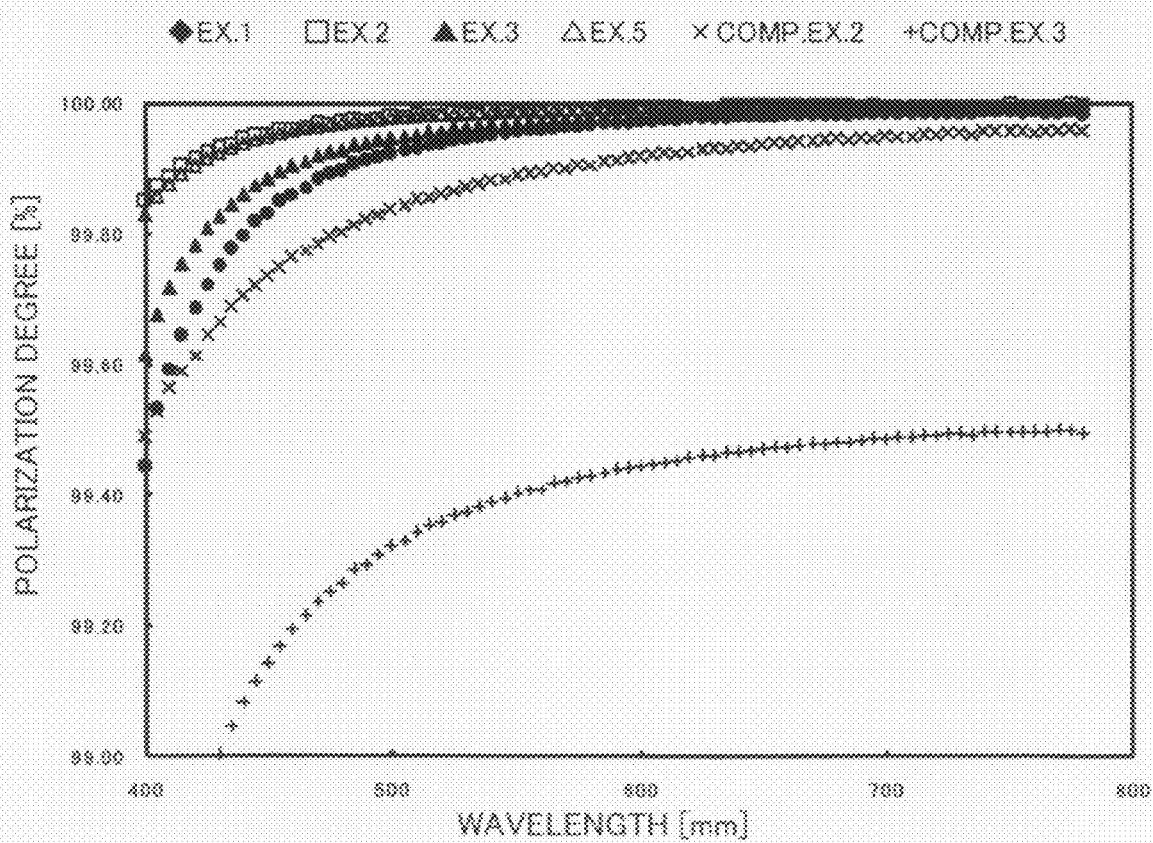
FIG. 5 is a graphical plot showing the degree of polarization of wire grid polarizer according to the embodiment of the invention and of wire grid polarizer of Comparative Examples.
Figure 6:
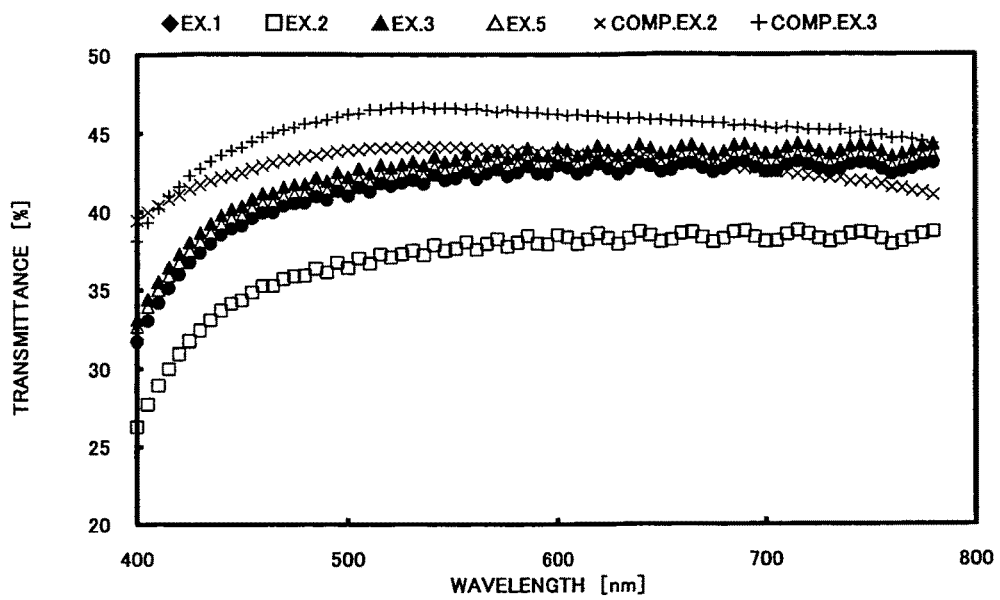
FIG. 6 is a graphical plot showing light transmittance of the wire grid polarizer according to the embodiment of the invention and of the wire grid polarizer of Comparative Examples.

The degree of polarization and light transmittance were measured on each of obtained wire grid polarizers of the Examples and Comparative Examples using a spectrophotometer. Herein, the transmittance was measured in parallel Nicol state and orthogonal Nicol state for linearly polarized light, and the degree of polarization and light transmittance were calculated from following equations. A range of measured wavelengths was from 400 nm to 800 nm as the visible light. FIG. 5 shows changes in degree of polarization in the range of 400 nm to 800 nm, and FIG. 6 shows changes in light transmittance in the range of 400 nm to 800 nm.

Degree of polarization=[($I$max−$I$min)/($I$max+$I$min)]×100%

Light transmittance=[($I$max+$I$min)/2]×100%

Herein, Imax represents the transmittance in parallel Nicol state, while Imin represents the transmittance in orthogonal Nicol state.

According to the invention, since a wire grid polarizer has a resin substrate having grid-shaped convex portions, a dielectric layer provided to cover the grid-shaped convex portions of the resin substrate and at least part of side faces of the portions, and metal wires provided on the dielectric layer, it is possible to obtain the wire grid polarizer which is provided with adequate adhesion among the resin substrate, dielectric layer and metal wires, and has both the excellent degree of polarization and excellent transmittance over a wide range in the visible region. Further, it is possible to obtain the wire grid polarizer with the pitch of 120 nm or less, and to achieve the excellent degree of polarization and excellent transmittance. Furthermore, it is possible to manufacture the wire grid polarizer with the large area of 100 cm$^2$ or more with ease.

(Applications)

It is possible to apply the above-mentioned wire grid polarizer to thin polarizers exhibiting excellent optical characteristics with their thickness being extremely thin and polarizers having remarkably high degrees of polarization.

[Thin Polarizer]

In recent years, portable terminal apparatuses such as cellular telephones have been required to reduce their thickness

TABLE 1

| | MATERIAL OF DIELECTRIC *1 | AVERAGE REFRACTIVE INDEX OF REGION B | p [nm] | H1 [nm] | H2 [nm] | H3 [nm] | w3 [nm] | wH/wL [nm] | POLARIZATION DEGREE [%] *2 | TRANSMITTANCE [%] *2 |
|---|---|---|---|---|---|---|---|---|---|---|
| EX. 1 | SILICON NITRIDE | 1.59 | 140 | 128 | 165 | 153 | 67 | 0.68 | 99.96 | 42 |
| EX. 2 | SILICON NITRIDE | 1.59 | 140 | 128 | 165 | 180 | 69 | 0.68 | 99.99 | 38 |
| EX. 3 | SILICON NITRIDE | 1.56 | 120 | 110 | 141 | 151 | 54 | 0.70 | 99.97 | 43 |
| EX. 4 | SILICON OXIDE | 1.24 | 120 | 110 | 155 | 153 | 54 | 0.70 | 99.97 | 41 |
| EX. 5 | SILICON NITRIDE | 1.56 | 100 | 92 | 128 | 145 | 45 | 0.70 | 99.99 | 43 |
| EX. 6 | SILICON NITRIDE | 1.56 *3 | 120 | 110 | 144 | 152 | 54 | 0.70 | 99.97 | 41 |
| COMP. EX. 1 | NON | | 120 | 110 | — | NOT FORMED | | | — | — |
| COMP. EX. 2 | — | | 144 | — | — | 180 | 70 | | 99.89 | 44 |
| COMP. EX. 3 | — | | 144 | — | — | 150 | 68 | | 99.40 | 47 |

*1 REFRACTIVE INDEX OF SILICON OXIDE: 1.49
REFRACTIVE INDEX OF SILICON NITRIDE: 2.05
*2 VALUES OF THE DEGREE OF POLARIZATION AND LIGHT TRANSMITTANCE FOR LIGHT WITH A WAVELENGTH OF 550 NM
*3 THE REFRACTIVE INDEX OF THE B REGION PRIOR TO DEPOSITION OF ALUMINIUM BECAUSE OF ALUMINIUM DEPOSITED ON THE CONVEX PORTION

As can be seen from FIG. 5, wire grid polarizers (Examples 1, 2, 3 and 5) according to the present invention exhibited excellent degrees of polarization over almost the entire visible region. Further, as can be seen from FIG. 6, the wire grid polarizers according to the invention exhibited excellent light transmittances over almost the entire visible region. Meanwhile, as shown in FIG. 5, wire grid polarizers of the Comparative Examples were low in the degree of polarization at short wavelengths in the visible region. Thus, it was found that the wire grid polarizer according to the invention has the microstructural concavo-convex grid, is not limited in structure, and has both the excellent degree of polarization and excellent transmittance over a wide range in the visible region.

and weight, and to reduce the thickness of each member as much as possible. A polarizer that is one component of the portable terminal apparatus has the same requirement, and is required to reduce its thickness as much as possible while maintaining required optical characteristics.

Typical polarizers include an absorption polarizer obtained by adding iodide to a PVA (polyvinyl alcohol) resin. The absorption polarizer is formed by applying protective films made of a TAC (triacetyl cellulose) resin on both sides of a polarizing film such that iodide is added to PVA. In the polarizing film, to exhibit optical absorption performance, the film is required to have the thickness enabling an adequate amount of iodide to be reserved in the optical path, and the thickness of the PVA resin is at least 20 μm. Further, the TAC film is required to have the thickness of about 40 μm because of the need for acquiring sufficient strength as a film. Accordingly, the thickness of the absorption polarizer is about 100 μm as a whole.

Further, Japanese Patent Laid-Open No. H04-268505 discloses a reflection polarization type of polarizer using a difference in refractive index due to selective reflection of cholesteric liquid crystal and lamination of films, and this polarizer also has an entire thickness of about 100 μm.

Thus, both of the conventional absorption and reflection polarizers have the thickness of 100 μm or more, and under present circumstances, there is no polarizer that exhibits excellent optical characteristics and has the thickness less than 100 μm.

Therefore, the thin polarizer of the invention is characterized by having the thickness of 80 μm or less, the degree of polarization of 99.9% or more, the transmittance of 35% or more, and the reflectance of 30% or more.

Further, the thin polarizer of the invention is preferably comprised of a substrate having grid-shaped convex portions on its surface, a dielectric layer provided on a region including the grid-shaped convex portions, and metal wires provided on the dielectric layer.

It is preferable that the thin polarizer of the invention is comprised of a substrate having grid-shaped convex portions on its surface, and metal wires provided on a region including the grid-shaped convex portions.

The thin polarizer of the invention is preferably comprised of a resin substrate having grid-shaped convex portions, a dielectric layer provided to cover the grid-shaped convex portions of the resin substrate and at least part of side faces of the portions, and metal wires of which top portions are positioned higher than the convex portions of the dielectric layer.

In the thin polarizer of the invention, it is preferable that the metal wires are deposited leaning to one side faces of the convex portions of the dielectric layer.

In the thin polarizer, a height difference $H_2$ preferably ranges from 100 nm to 300 nm between a convex-portion peak and a concave-portion valley of a concavo-convex grid formed by covering the grid-shaped convex portions of the resin substrate with the dielectric.

In the thin polarizer of the invention, it is preferable that pitches of the grid-shaped convex portions of the resin substrate are 150 nm or less, and that heights thereof are 0.5 time to 2 times the pitches.

A thin polarizer of the invention is preferably comprised of a resin substrate having grid-shaped convex portions, a dielectric layer provided to cover the grid-shaped convex portions of the resin substrate and at least part of side faces of the portions, and metal wires provided on the dielectric layer, where as a cross-sectional shape of the convex portions of the concavo-convex grid formed by covering the grid-shaped convex portions of the resin substrate with the dielectric, in a plane intersecting perpendicularly the longitudinal direction of the grid, the concave portion is substantially in the shape of a parabola, and wH/wL is a ratio of a convex-portion width wH at a height two-thirds a height of the convex portion from a bottom to a convex-portion width wL at a height one-third the height of the convex portion from the bottom, and ranges from 0.3 to 0.9.

In the thin polarizer, a height difference $H_2$ preferably ranges from 100 nm to 300 nm between a convex-portion peak and a concave-portion valley of the concavo-convex grid formed by covering the grid-shaped convex portions of the resin substrate with the dielectric.

In the thin polarizer, a width $w_2$ (hereinafter, referred to as a width of the dielectric layer) at a height half the height difference $H_2$, which is between the convex-portion peak and the concave-portion valley of the concavo-convex grid formed by covering the grid-shaped convex portions of the resin substrate with the dielectric, is preferably 0.1 time to 0.5 time the pitches of the grid-shaped convex portions of the resin substrate.

In the thin polarizer of the invention, the metal wires are preferably formed upward from slanting side faces 1b of the convex portions of the concavo-convex grid formed by covering the grid-shaped convex portions of the resin substrate with the dielectric.

Further, a liquid crystal display device of the invention is characterized by having a liquid crystal panel, a lighting member that applies light to the liquid crystal panel, and the above-mentioned thin polarizer arranged between the liquid crystal panel and the lighting member.

According to the thin polarizer of the invention, since the thickness is 80 μm or less, the degree of polarization is 99.9% or more, the transmittance is 35% or more, and the reflectance is 30% or more, it is possible to actualize a thin polarizer that exhibits excellent optical characteristics while having a thickness less than 100 μm.

Figure 7:
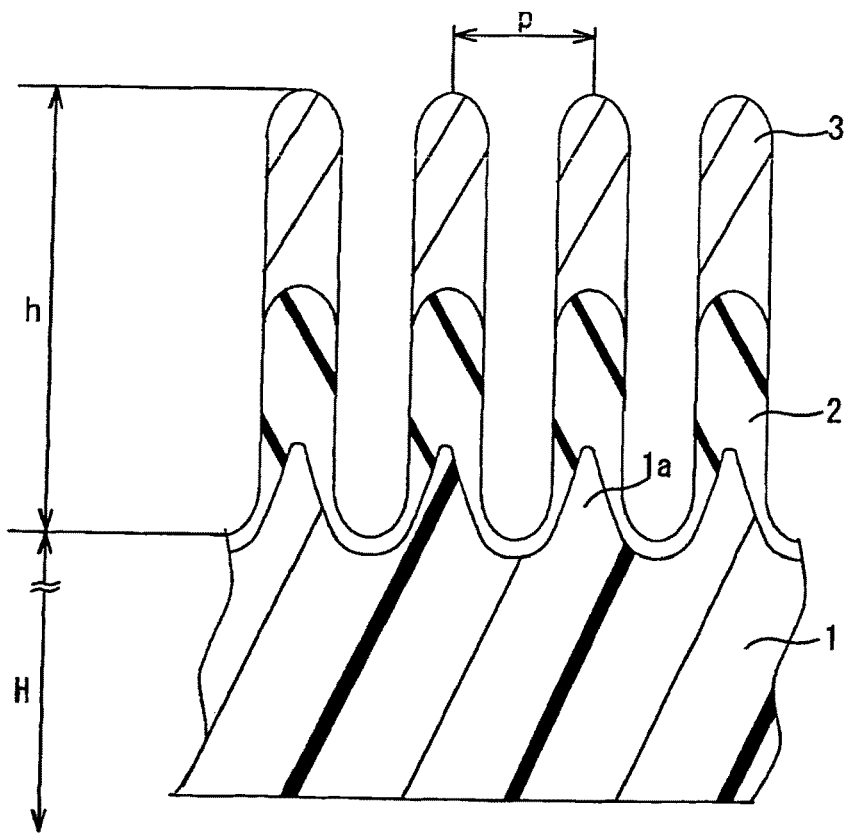
FIG. 7 is a schematic cross-sectional view showing a wire grid polarizer.

As shown in FIG. 7, the thin polarizer is mainly comprised of a substrate 1 having grid-shaped convex portions 1a on its surface, a dielectric layer 2 provided on the substrate 1, and metal wires 3 provided to stand on the dielectric layer 2. In addition, it is not necessary to always provide the dielectric layer 2.

In the thin polarizer, the materials of the substrate 1, pitches of the grid-shaped convex portions 1a, cross-sectional shape of the grid-shaped convex portions 1a, and the method of providing the grid-shaped convex portions on the substrate 1 are as described above. The pitch p of the grid-shaped convex portions 1a of the substrate 1, the pitch of the dielectric layer 2 and the pitch of the metal wires 3 are almost the same as pitches of the wire grid of the invention, and are able to adopt the same pitches. Further, the dielectric constituting the dielectric layer 2, and the method of forming the dielectric layer 2 on a region including the grid-shaped convex portions of the substrate 1 having the grid-shaped convex portions 1a are as described above. Furthermore, the metal constituting the metal wires 3 and the method of depositing the metal on the substrate 1 or dielectric layer 2 to form the metal wires 3 are as described above.

As shown in FIG. 7, the thin polarizer having the above-mentioned structure has a base area and a polarization area provided on the base area. A thickness H of the base area is basically a thickness of the substrate 1, and ranges from about 5 μm to about 80 μm. Further, a thickness h of the polarization area contains the grid-shaped convex portions 1a, dielectric layer 2 and metal wires 3, and is less than 1 μm. Accordingly, the entire thickness of the thin polarizer is 80 μm or less.

The thin polarizer having the above-mentioned structure has a polarization area of the wire grid polarizer, and therefore, has the degree of polarization of 99.9% or more, the transmittance of 35% or more, and the reflectance of 30% or more.

A liquid crystal display device using the thin polarizer with such a structure is as shown in FIG. 2. The operation in the liquid crystal display device using such a thin polarizer is as described above.

Described next is an Example performed to clarify the effects of the thin polarizer.

(Preparation of a Substrate Having the Grid-shaped Convex Portions)

Formation of the Shape of a Microstructural Concavo-Convex Grid

A microstructural concavo-convex grid was formed on a substrate obtained by applying a photoresist onto glass, using an electron-beam rendering method. The surface and cross section of the resist pattern were observed using a field-emission scanning electron microscope (FE-SEM), and it was found out that the pitch and height of the microstructural concavo-convex grid were respectively 115 nm and 130 nm (pitch/height), the cross-sectional shape was in the form of a trapezoid, the shape viewed from the above was in the form of a streak-shaped grid, the width of the convex portion was 45 nm, and that the width of the valley portion was 70 nm.

Preparation of a Nickel Stamper

The obtained resist pattern surface with the pitch of 115 nm was coated with gold in 30 nm by sputtering as processing of providing conductivity, and given electro-nickel-plating, and prepared was a nickel stamper with a thickness of 0.3 mm and microstructural concavo-convex grid on its surface.

Preparation of a Grid-shaped Convex-portion Transferred Film Using a UV Curable Resin A polyethylene terephthalate resin film (hereinafter, referred to as a PET film) with a thickness of 40 μm was coated with a UV curable resin (PAK01, Toyo Gosei Co., Ltd.) to have a thickness of about 1 μm of the resin. With the coated surface downward, the PET film was mounted on the nickel stamper having the microstructural concavo-convex grid with the pitch of 115 nm on its surface starting with the end portions for the air not to enter between the nickel stamper and film, and radiated with UV rays of 1000 mJ/cm$^2$ from the PET film side using a UV lamp with the center wavelength of 365 nm to transfer the microstructural concavo-convex grid of the nickel stamper. The obtained grid-shaped convex-portion transferred film was observed using FE-SEM, and it was confirmed that the cross-sectional shape was almost in the form of a trapezoid, and that the shape viewed from the above was in the form of a streak-shaped grid.

EXAMPLE 7

Preparation of the Thin Polarizer

Formation of a Dielectric Layer Using a Sputtering Method

The grid-shaped convex-portion transferred film prepared by using the UV curable resin as described above was coated with a dielectric using the sputtering method. This embodiment describes the case of using silicon nitride as the dielectric. The dielectric was coated at an Ar gas pressure of 0.67 Pa, sputtering power of 4 W/cm$^2$ and coating rate of 0.22 nm/sec. A glass substrate with a smooth substrate was set in a sputtering machine as a thickness comparative sample concurrently with the grid-shaped convex-portion transferred film, and film formation was performed so that a deposition thickness of the dielectric layer on the smooth glass substrate was 5 nm.

Deposition of Metal Using a Vacuum Deposition Method

After the dielectric layer was formed on the grid-shaped convex-portion transferred film, metal wires were formed using an electron beam vacuum deposition method (EB deposition method). This embodiment describes the case of using aluminium (Al) as metal. The deposition was performed at a degree of vacuum of 2.5×10$^{-3}$ Pa and deposition rate of 20 nm/sec. with the temperature of the substrate being room temperature. A glass substrate with a smooth substrate was set in an EB deposition machine as a thickness comparative sample concurrently with the dielectric coated grid-shaped convex-portion transferred film, and deposition was performed so that a thickness of Al deposition on the smooth substrate was 170 nm. In addition, an angle θ formed between the normal of the substrate plane and the deposition source was 20° within the plane perpendicularly intersecting the longitudinal direction of the grid.

Removal of Unnecessary Metal by Etching

After the dielectric and Al was deposited on the grid-shaped convex-portion transferred film, each film was cleaned (etching) in an aqueous 0.1 wt % sodium hydroxide solution at room temperature for 30 to 120 seconds of the processing time while being changed at ten-second intervals, and rinsed immediately to halt etching. The film was dried to obtain a thin polarizer. The thickness of the film was 41 μm.

(Evaluation of Polarization Performance Using a Spectrophotometer)

The degree of polarization and light transmittance were measured on the obtained thin polarizer of Example 7 using a spectrophotometer. Herein, the transmittance was measured in parallel Nicol state and orthogonal Nicol state for linearly polarized light, and the degree of polarization and light transmittance were calculated from equations described previously. A range of measured wavelengths was from 400 nm to 700 nm as the visible light.

As a result, in the thin polarizer subjected to 90-second etching processing, the degree of polarization was 99.91%, and the light transmittance was 41.9%.

(Reflectance Evaluation)

The reflectance was measured on the obtained thin polarizer of Example 7 using a spectrophotometer by applying the light with an incident angle of 8 degrees to the wire grid surface, and was 41.3%.

COMPARATIVE EXAMPLE 4

Preparation of a Thin Polarizer

An iodide containing PVA film was thinned to have a thickness of 10 μm, TAC films with a thickness of 20 μm were applied to both sides of the film, and an absorption polarizer was prepared. The degree of polarization and light transmittance were examined on the absorption polarizer as described above. As a result, the degree of polarization was 96.5%, and the light transmittance was 46.8%. Thus, this absorption polarizer did not exhibit sufficient optical performance. Particularly, with respect to the degree of polarization, it is considered that the amount of iodide was not enough to exhibit the polarization performance, and that the degree of polarization was a low value.

[Polarizer with a High Degree of Polarization]

In recent years, liquid crystal display devices have been used in television apparatuses, and becoming considerably widespread. However, the liquid crystal display devices do not provide sufficient contrast, and have a problem that black display is not visually recognized as black but as gray in a dark environment. Therefore, liquid crystal display devices are not adopted as a monitor and the like used in a dark environment such as a broadcast station.

Thus, under present circumstances, the conventional liquid crystal display devices are not provided with enough contrast to enable black display to be visually recognized as black in a dark environment.

Therefore, a polarizer with a high degree of polarization of the invention is characterized by having an absorption polarizer that absorbs a polarized component of incident light that is not passed through to generate polarized light, and a reflection polarizer which is provided on the absorption polarizer and reflects the polarized component of incident light that is not passed through to generate polarized light, where the degree of polarization is 99.9999% or more, the transmittance is 35% or more, and the reflectance is 30% or more.

Further, in the polarizer with a high degree of polarization of the invention, the reflection polarizer is preferably comprised of a substrate having grid-shaped convex portions on its surface, and metal wires provided on a region including the grid-shaped convex portions.

It is preferable that the polarizer with a high degree of polarization of the invention is comprised of a substrate having grid-shaped convex portions on its surface, and metal wires provided on a region including the grid-shaped convex portions.

The polarizer with a high degree of polarization of the invention is preferably comprised of a resin substrate having grid-shaped convex portions, a dielectric layer provided to cover the grid-shaped convex portions of the resin substrate and at least part of side faces of the portions, and metal wires of which top portions are positioned higher than the convex portions of the dielectric layer.

In the polarizer with a high degree of polarization of the invention, it is preferable that the metal wires are deposited leaning to one side faces of the convex portions of the dielectric layer.

In the polarizer with a high degree of polarization, a height difference $H_2$ preferably ranges from 100 nm to 300 nm between a convex-portion peak and a concave-portion valley of a concavo-convex grid formed by covering the grid-shaped convex portions of the resin substrate with the dielectric.

In the polarizer with a high degree of polarization of the invention, it is preferable that pitches of the grid-shaped convex portions of the resin substrate are 150 nm or less, and that heights thereof are 0.5 time to 2 times the pitches.

A polarizer with a high degree of polarization of the invention is preferably comprised of a resin substrate having grid-shaped convex portions, a dielectric layer provided to cover the grid-shaped convex portions of the resin substrate and at least part of side faces of the portions, and metal wires provided on the dielectric layer, where as a cross-sectional shape of the convex portions of the concavo-convex grid formed by covering the grid-shaped convex portions of the resin substrate with the dielectric, in a plane intersecting perpendicularly the longitudinal direction of the grid, the concave portion is substantially in the shape of a parabola, and wH/wL is a ratio of a convex-portion width wH at a height two-thirds a height of the convex portion from a bottom to a convex-portion width wL at a height one-third the height of the convex portion from the bottom, and ranges from 0.3 to 0.9.

In the polarizer with a high degree of polarization, a height difference $H_2$ preferably ranges from 100 nm to 300 nm between a convex-portion peak and a concave-portion valley of the concavo-convex grid formed by covering the grid-shaped convex portions of the resin substrate with the dielectric.

In the polarizer with a high degree of polarization, a width $w_2$ (hereinafter, referred to as a width of the dielectric layer) at a height half the height difference $H_2$, which is between the convex-portion peak and the concave-portion valley of the concavo-convex grid formed by covering the grid-shaped convex portions with the dielectric, is preferably 0.1 time to 0.5 time the pitches of the grid-shaped convex portions of the resin substrate.

In the polarizer with a high degree of polarization of the invention, the metal wires are preferably formed upward from slanting side faces 1b of the convex portions of the concavo-convex grid formed by covering the grid-shaped convex portions of the resin substrate with the dielectric.

Further, a liquid crystal display device of the invention is characterized by having a liquid crystal panel, a lighting member that applies light to the liquid crystal panel, and the above-mentioned polarizer with a high degree of polarization disposed between the liquid crystal panel and the lighting member.

According to the polarizer with a high degree of polarization of the invention, the polarizer has an absorption polarizer that absorbs a polarized component of incident light that is not passed through to generate polarized light, and a reflection polarizer which is provided on the absorption polarizer and reflects the polarized component of incident light that is not passed through to generate polarized light, the degree of polarization is 99.9999% or more, the transmittance is 35% or more, and the reflectance is 30% or more. Therefore, when the polarizer is used in a liquid crystal display device, it is possible to exhibit enough contrast to enable black display to be visually recognized as black in a dark environment, and to use the light effectively.

Figure 8:
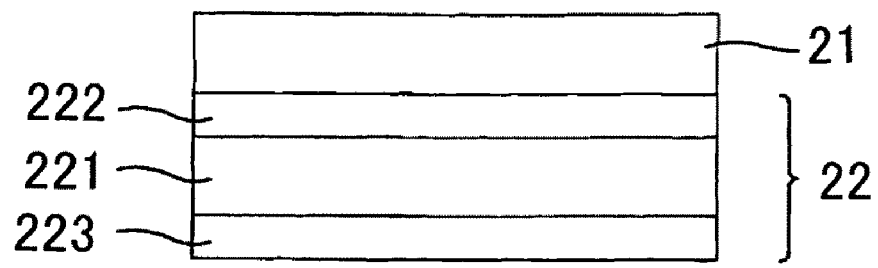
FIG. 8 is a cross-sectional view showing part of a thin polarizer according to the embodiment of the invention.

As shown in FIG. 8, this polarizer is principally comprised of an absorption polarizer 22 that absorbs the incident light to polarize, and a reflection polarizer 21 which is provided on the absorption polarizer 22 and reflects the incident light to polarize.

The absorption polarizer 22 is comprised of a polarizing film 221 with iodide added to a PVA (polyvinyl alcohol) resin, and protective films 222 and 223 made of a TAC (triacetyl cellulose) resin coated on both sides of the polarizing film 221. In addition, this embodiment describes the case of using the absorption polarizer obtained by adding iodide to a PVA resin as the absorption polarizer 22, but the invention is not limited thereto, and is applicable to cases using absorption polarizers with other structures.

The reflection polarizer 21 is the wire grid polarizer as described previously. The materials of the substrate 1, pitches of the grid-shaped convex portions 1a, cross-sectional shape of the grid-shaped convex portions 1a, and the method of providing the grid-shaped convex portions on the substrate 1 are as described above. The pitch p of the grid-shaped convex portions 1a of the substrate 1, the pitch of the dielectric layer 2 and the pitch of the metal wires 3 are almost the same as pitches of the wire grid of the invention, and are able to adopt the same pitches. Further, the dielectric constituting the dielectric layer 2, and the method of forming the dielectric layer 2 on a region including the grid-shaped convex portions of the substrate 1 having the grid-shaped convex portions 1a are as described above. Furthermore, the metal constituting the metal wires 3 and the method of depositing the metal on the substrate 1 or dielectric layer 2 to form the metal wires 3 are as described above.

In the polarizer with a high degree of polarization having the above-mentioned structure, since the polarizer has the wire grid polarizer as a reflection polarizer on the absorption polarizer, it is possible to remarkably enhance the degree of polarization of transmitted light by making full use of reflection of the light on the non-transmission axis and the high degree of polarization of the wire grid polarizer, thereby improving light use efficiency, and combining the absorption polarizer, and such characteristics can be actualized with a low number of components. The high degree of polarization is also obtained by stacking a plurality of absorption polarizers, but the absorption loss of the absorption polarizer is high, and the amount of the transmitted light decreases. A high transmittance and high reflectance are required to obtain sufficient brightness as an image, a high degree of polarization is required to obtain high contrast, and as specific performance, it is preferable that the degree of polarization is 99.9999% or more, the transmittance is 35% or more, and that the reflectance is 30% or more. By meeting these requirements, it is possible to realize an image with high brightness and ultra-high contrast.

Figure 9:
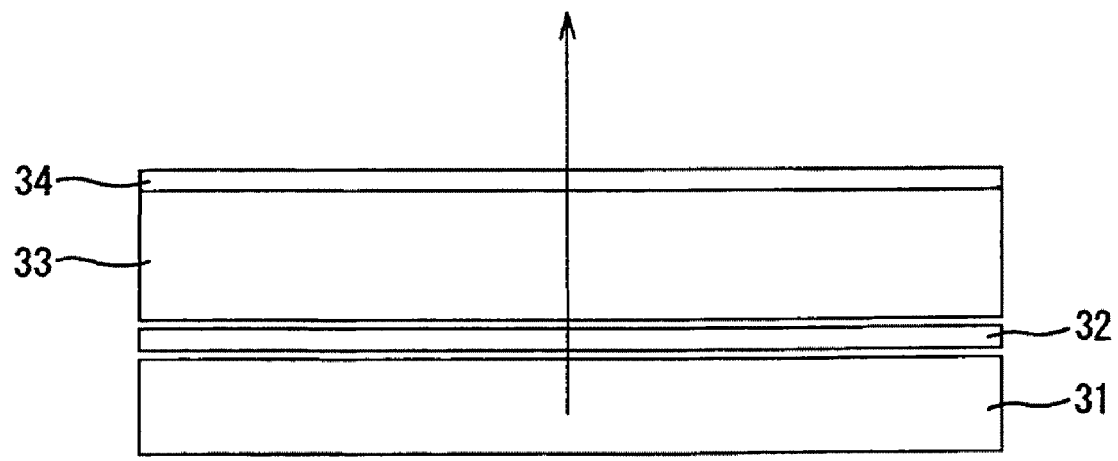
FIG. 9 is a cross-sectional view showing a polarizer with a high degree of polarization according to the embodiment of the invention.
Figure 10:
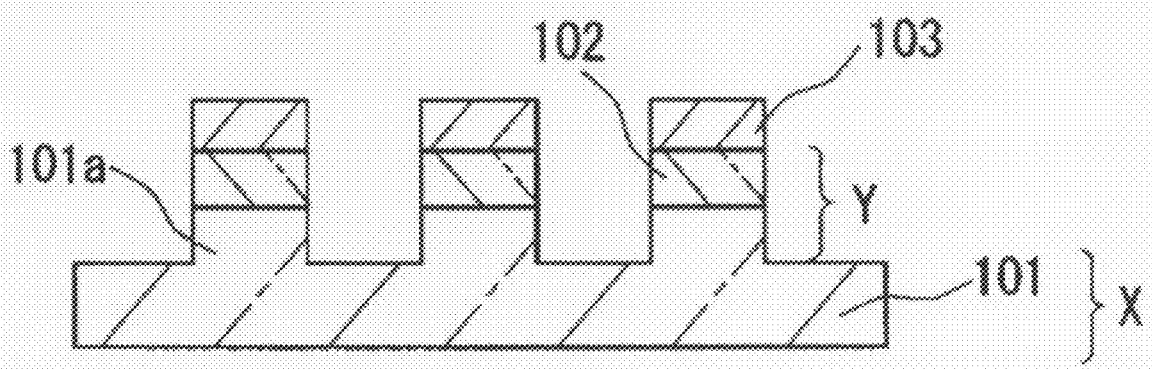
FIG. 10 is a diagram illustrating a liquid crystal display device using the polarizer with a high degree of polarization according to the embodiment of the invention.

FIG. 9 is a diagram illustrating a liquid crystal display device using the polarizer with a high degree of polarization according to the embodiment of the invention. The liquid crystal display device as shown in FIG. 9 is mainly comprised of a lighting device 31 such as a backlight that emits light, a polarizer 32 (wire grid polarizer+absorption polarizer) with a high degree of polarization disposed on the lighting device 31, and a liquid crystal panel 33 and a polarizer 34 both disposed on the polarizer 32. The polarizer 32 according to the invention is arranged between the liquid crystal panel 33 and the lighting device 31 with the wire grid polarizer facing the lighting device 31 side.

The liquid crystal panel 33 is a transmission liquid crystal panel, and is formed of liquid crystal material and the like supported between glass or transparent substrates. In addition, in the liquid crystal display device in FIG. 9, descriptions are omitted on various optical elements such as a polarizer protective film, retardation film, diffusion plate, alignment film, transparent electrode, color filter and the like which are generally used.

In the liquid crystal display device with such a configuration, the light output from the lighting device 31 is incident from the wire grid polarizer 1 side of the polarizer 32 with the high degree of polarization, passed through the liquid crystal panel 33 from the absorption polarizer 2 side and output to the outside (the direction of the arrow in the figure). In this case, the polarizer 32 exhibits the excellent degree of polarization in the visible region, and it is thereby possible to obtain display with extremely high contrast. Further, the light that is not passed through the wire grid polarizer 1 is reflected toward the lighting device 31 to be reused, and it is thereby possible to obtain high brightness.

Described next is an Example performed to clarify the effects of the polarizer with a high degree of polarization.

(Preparation of a Substrate Having the Grid-shaped Convex Portions)

Formation of the Shape of a Microstructural Concavo-convex Grid

A microstructural concavo-convex grid was formed on a substrate obtained by applying a photoresist onto glass, using an electron-beam rendering method. The surface and cross section of the resist pattern were observed using a field-emission scanning electron microscope (FE-SEM), and it was found out that the pitch and height of the microstructural concavo-convex grid were respectively 115 nm and 130 nm (pitch/height), the cross-sectional shape was in the form of a trapezoid, the shape viewed from the above was in the form of a streak-shaped grid, the width of the convex portion was 45 nm, and that the width of the valley portion was 70 nm.

Preparation of a Nickel Stamper

The obtained resist pattern surface with the pitch of 115 nm was coated with gold in 30 nm by sputtering as processing of providing conductivity, and given electro-nickel-plating, and prepared was a nickel stamper with a thickness of 0.3 mm and microstructural concavo-convex grid on its surface.

Preparation of a Grid-shaped Convex-portion Transferred Film Using a UV Curable Resin A polyethylene terephthalate resin film (hereinafter, referred to as a PET film) with a thickness of 0.1 mm was coated with a UV curable resin (PAK01, Toyo Gosei Co., Ltd.) to have a thickness of about 0.03 mm of the resin. With the coated surface downward, the PET film was mounted on the above-mentioned nickel stamper having the microstructural concavo-convex grid with the pitch of 115 nm on its surface starting with the end portions for the air not to enter between the nickel stamper and film, and radiated with UV rays of 1000 mJ/cm$^2$ from the PET film side using a UV lamp with the center wavelength of 365 nm to transfer the microstructural concavo-convex grid of the nickel stamper. The obtained grid-shaped convex-portion transferred film was observed using FE-SEM, and it was confirmed that the cross-sectional shape was almost in the form of a trapezoid, and that the shape viewed from the above was in the form of a streak-shaped grid.

EXAMPLE 8

Preparation of the Polarizer with a High Degree of Polarization

Formation of a Dielectric Layer Using a Sputtering Method

The grid-shaped convex-portion transferred film prepared by using the UV curable resin as described above was coated with a dielectric using the sputtering method. This embodiment describes the case of using silicon nitride as the dielectric. The dielectric was coated at an Ar gas pressure of 0.67 Pa, sputtering power of 4 W/cm$^2$ and coating rate of 0.22 nm/sec. A glass substrate with a smooth substrate was set in a sputtering machine as a thickness comparative sample concurrently with the grid-shaped convex-portion transferred film, and film formation was performed so that a deposition thickness of the dielectric layer on the smooth glass substrate was 5 nm.

Deposition of Metal Using a Vacuum Deposition Method

After the dielectric layer was formed on the grid-shaped convex-portion transferred film, metal wires were formed using an electron beam vacuum deposition method (EB deposition method). This embodiment describes the case of using aluminium (Al) as metal. The deposition was performed at a degree of vacuum of 2.5×10$^{-3}$ Pa and deposition rate of 20 nm/sec. with the temperature of the substrate being room temperature. A glass substrate with a smooth substrate was set in an EB deposition machine as a thickness comparative sample concurrently with the dielectric coated grid-shaped convex-portion transferred film, and deposition was performed so that a thickness of Al deposition on the smooth substrate was 170 nm. In addition, an angle θ formed between the normal of the substrate plane and the deposition source was 20° within the plane perpendicularly intersecting the longitudinal direction of the grid.

Removal of Unnecessary Metal by Etching

After the dielectric and Al was deposited on the grid-shaped convex-portion transferred film, each film was cleaned (etching) in an aqueous 0.1 wt % sodium hydroxide solution at room temperature for 30 to 120 seconds of the processing time while being changed at ten-second intervals, and rinsed immediately to halt etching. The film was dried to obtain a wire grid polarizer. The wire grid polarizer subjected to 90-second etching was selected from the evaluation of polarization performance as described below.

(Bonding of the Absorption Polarizer)

An iodide-based absorption polarizer was bonded to the substrate 11 side of the obtained wire grid polarizer with the polarization axes matched using a transparent adhesive. The deviation of the polarization axis was adjusted to be within 0.1 degree.

(Evaluation of Polarization Performance)

The degree of polarization and light transmittance were measured using a spectrophotometer on the obtained polarizer with a high degree of polarization of Example 8, the wire grid polarizer prior to boding, and the absorption polarizer. Herein, the transmittance was measured in parallel Nicol state and orthogonal Nicol state for linearly polarized light, and the degree of polarization and light transmittance were calculated from equations described previously. A range of measured wavelengths was from 400 nm to 700 nm as the visible light.

As a result, in the polarizer with a high degree of polarization, the degree of polarization was 99.99995% and light transmittance was 35.4%. In the wire grid polarizer and the absorption polarizer, the degrees of polarization were 99.91% and 99.93%, and the light transmittances were 41.9% and 42.1%, respectively.

(Reflectance Evaluation)

The reflectance was measured on the obtained polarizer with a high degree of polarization of Example 8 using a spectrophotometer by applying the light with an incident angle of 8 degrees to the wire grid surface, and was 41.3%.

(Evaluation in the Liquid Crystal Display Device)

The obtained polarizer with a high degree of polarization of Example 8 was disposed as the polarizer 32 as shown in FIG. 9, the front brightness in white and black display was measured to calculate contrast, the front brightness in white display was 368 cd/m², and contrast was 80000.

COMPARATIVE EXAMPLE 5

Using an iodide-based absorption polarizer as a substitute for the wire grid polarizer of the Example, the degree of polarization and light transmittance were examined. As a result, the degree of polarization was 99.9995%, and the light transmittance was 35.5%. In the evaluation in the liquid crystal display device, the front brightness was 310 cd/m², contrast was 80000, and sufficient brightness was not exhibited.

The present invention is not limited to the above-mentioned embodiment and examples, and is capable of being carried into practice with various modifications thereof. For example, the dimensions and materials in the above-mentioned embodiment and examples are illustrative, and are capable of being modified as appropriate. Further, the polarizer in the above-mentioned embodiment is not necessarily a plate-shaped member, and may be in the shape of a sheet or in the shape of a film when necessary. The above-mentioned embodiment describes the case of applying the wire grid polarizer to a liquid crystal display device, but the invention is applicable similarly to devices requiring polarization other than the liquid crystal display device. Further, the invention is capable of being carried into practice in various modifications as appropriate without departing from the scope of the invention.

This application is based on the Japanese Patent Applications No. 2005-301883 filed on Oct. 17, 2005, No. 2006-232967 filed on Aug. 30, 2006, No. 2007-107540 filed on Apr. 16, 2007 and No. 2007-107541 filed on Apr. 16, 2007, and the entire contents of which are expressly incorporated by reference herein.

What is claimed is:

1. A thin polarizer having:
   a thickness of 80 μm or less;
   a degree of polarization of 99.9% or more;
   a transmittance of 35% or more; and
   a reflectance of 30% or more.

2. The thin polarizer according to claim 1, wherein the polarizer is formed of:
   a substrate having grid-shaped convex portions on its surface;
   a dielectric layer provided on a region including the grid-shaped convex portions; and
   metal wires provided on the dielectric layer.

3. The thin polarizer according to claim 2, wherein the polarizer comprises:
   a resin substrate having grid-shaped convex portions;
   a dielectric layer provided to cover the grid-shaped convex portions of the resin substrate and at least part of side faces of the portions; and
   metal wires of which top portions are positioned higher than the convex portions of the dielectric layer.

4. The thin polarizer according to claim 2 or 3, wherein the metal wires are deposited leaning to one side faces of the convex portions of the dielectric layer.

5. The thin polarizer according to claim 2 or 3, wherein a height difference $H_2$ ranges from 100 nm to 300 nm, the height difference $H_2$ between a convex-portion peak and a concave-portion valley of a concavo-convex grid formed by covering the grid-shaped convex portions of the resin substrate with the dielectric.

6. The thin polarizer according to claim 2 or 3, wherein pitches of the grid-shaped convex portions of the resin substrate are 150 nm or less, and heights thereof are 0.5 time to 2 times the pitches.

7. The thin polarizer according to claim 2 or 3, wherein the polarizer is a wire grid polarizer comprising:
   a resin substrate having grid-shaped convex portions;
   a dielectric layer provided to cover the grid-shaped convex portions of the resin substrate and at least part of side faces of the portions; and
   metal wires provided on the dielectric layer, and as a cross-sectional shape of the convex portions of a concavo-convex grid formed by covering the grid-shaped convex portions of the resin substrate with the dielectric, in a plane intersecting perpendicularly a longitudinal direction of the grid, a concave portion is substantially in the shape of a parabola, and wH/wL ranges from 0.3 to 0.9, the wH/wL being a ratio of a convex-portion width wH at a height two-thirds a height of a convex portion from a bottom to a convex-portion width wL at a height one-third the height of the convex portion from the bottom.

8. The thin polarizer according to claim 2 or 3, wherein a height difference $H_2$ ranges from 100 nm to 300 nm, the height difference $H_2$ between a convex-portion peak and a concave-portion valley of a concavo-convex grid formed by covering the grid-shaped convex portions of the resin substrate with the dielectric.

9. The thin polarizer according to claim 2 or 3, wherein a width $w_2$ at a height half a height difference $H_2$ is 0.1 time to 0.5 time pitches of the grid-shaped convex portions of the resin substrate, the height difference $H_2$ between a convex-portion peak and a concave-portion valley of a concavo-convex grid formed by covering the grid-shaped convex portions of the resin substrate with the dielectric.

10. The thin polarizer according to claim 2 or 3, wherein the metal wires are formed upward from slanting side faces of the convex portions of a concavo-convex grid formed by covering the grid-shaped convex portions of the resin substrate with the dielectric.

* * * * *